US009309099B2

(12) United States Patent
Dal Dosso et al.

(10) Patent No.: US 9,309,099 B2
(45) Date of Patent: Apr. 12, 2016

(54) SIDE-SHIFT LIMITER

(71) Applicant: Cascade Corporation, Portland, OR (US)

(72) Inventors: Andrea Dal Dosso, Verona (IT); Pat S. McKernan, Portland, OR (US); D. Clark Jordan, Boring, OR (US); Gregory A. Nagle, Portland, OR (US); David W. Petronek, Boring, OR (US)

(73) Assignee: Cascade Corporation, Portland, OR (US)

( * ) Notice: Subject to any disclaimer, the term of this patent is extended or adjusted under 35 U.S.C. 154(b) by 0 days.

(21) Appl. No.: 14/309,933

(22) Filed: Jun. 20, 2014

(65) Prior Publication Data

US 2015/0368080 A1 Dec. 24, 2015

(51) Int. Cl.
*B66F 9/24* (2006.01)
*G01B 11/00* (2006.01)

(52) U.S. Cl.
CPC .. *B66F 9/24* (2013.01); *G01B 11/00* (2013.01)

(58) Field of Classification Search
CPC ............ B66F 9/122; B66F 9/146; B66F 9/16; B66F 9/22; B66F 9/07; B66F 9/08; G06K 7/10722; G06K 7/10762
USPC ........... 702/156; 137/456; 414/639, 664, 666; 180/167; 187/393; 53/399; 410/30; 211/41.1; 235/438, 440; 177/145
See application file for complete search history.

(56) References Cited

U.S. PATENT DOCUMENTS 2,967,717 A * 1/1961 Track ..................... B60G 11/26 137/456
3,166,207 A 1/1965 Quayle
3,241,697 A * 3/1966 Rogant ................... B66F 9/147 414/666
3,738,520 A 6/1973 Didtel et al.
3,990,594 A 11/1976 Olson et al.
4,543,031 A 9/1985 Luebrecht et al.
4,849,735 A * 7/1989 Kirtley .................. B66F 17/003 180/167
5,052,882 A 10/1991 Blau et al.
5,088,880 A 2/1992 Field, Jr.
5,336,039 A 8/1994 House
5,749,696 A * 5/1998 Johnson .................. B66F 9/082 187/393
5,927,932 A 7/1999 Seaberg
6,056,503 A 5/2000 Way et al.
6,834,574 B2 12/2004 Neumann (Continued)

FOREIGN PATENT DOCUMENTS

CA 2651695 A1 11/2007
DE 2810893 A1 9/1979

(Continued)

OTHER PUBLICATIONS

Installation & User Manual, Sideshift Limit Kit 6836800, Cascade Corporation, May 2013, 12 pgs.

(Continued)

*Primary Examiner* — James Trammell
*Assistant Examiner* — Sanjeev Malhotra
(74) *Attorney, Agent, or Firm* — Chernoff Vilhauer McClung & Stenzel, LLP

(57) ABSTRACT

A side shift limiting attachment for a material handing vehicle alerts the vehicles operator and restricts side shifting, lifting, tilting and/or rotation of the attachment when the side shift displacement is approaching or has reached a limit for a lift height.

36 Claims, 7 Drawing Sheets

(56) References Cited

U.S. PATENT DOCUMENTS

| | | | | |
|---|---|---|---|---|
| 7,018,159 | B2 | 3/2006 | Jordan et al. | |
| 7,165,652 | B2 | 1/2007 | Allerding et al. | |
| 7,287,625 | B1 | 10/2007 | Harris | |
| 8,078,315 | B2 | 12/2011 | McKernan et al. | |
| 8,140,228 | B2 | 3/2012 | McCabe et al. | |
| 8,403,618 | B2 | 3/2013 | Prentice et al. | |
| 8,466,380 | B2 * | 6/2013 | Inoue | G01G 13/08 177/145 |
| 2004/0153283 | A1 * | 8/2004 | Wargon | A22C 17/0013 702/156 |
| 2004/0154871 | A1 | 8/2004 | Allerding et al. | |
| 2006/0115354 | A1 | 6/2006 | Prentice et al. | |
| 2006/0130474 | A1 | 6/2006 | Segerljung | |
| 2006/0232025 | A1 | 10/2006 | Braud | |
| 2009/0272257 | A1 | 11/2009 | Petronek | |
| 2010/0162660 | A1 * | 7/2010 | Jaconelli | B65B 9/14 53/399 |
| 2011/0236148 | A1 * | 9/2011 | Anderson | B60P 3/077 410/30 |
| 2012/0101684 | A1 | 4/2012 | Takazato | |
| 2012/0107077 | A1 | 5/2012 | Alveteg | |
| 2012/0171004 | A1 * | 7/2012 | Jones, Jr. | B66F 9/22 414/664 |
| 2012/0175323 | A1 * | 7/2012 | Ceron Garcia | B65D 85/30 211/41.1 |
| 2013/0020391 | A1 * | 1/2013 | Olmstead | G06K 7/10722 235/438 |
| 2013/0020392 | A1 * | 1/2013 | Olmstead | G06K 7/10722 235/440 |
| 2013/0182237 | A1 | 7/2013 | Viereck et al. | |
| 2013/0205610 | A1 | 8/2013 | Wildner | |
| 2013/0211679 | A1 | 8/2013 | Gerdes et al. | |
| 2013/0277584 | A1 | 10/2013 | McKernan et al. | |
| 2013/0293365 | A1 | 11/2013 | Ascencio | |
| 2014/0219758 | A1 * | 8/2014 | Soder | B66F 9/146 414/639 |
| 2014/0219759 | A1 * | 8/2014 | Soder | B66F 9/146 414/664 |
| 2014/0219760 | A1 * | 8/2014 | Soder | B66F 9/146 414/664 |

FOREIGN PATENT DOCUMENTS

| | | | |
|---|---|---|---|
| EP | 0489255 | A1 | 6/1990 |
| EP | 0291021 | A2 | 6/1999 |
| EP | 0921021 | A2 | 6/1999 |
| EP | 2527288 | A1 | 11/2012 |
| WO | 81/02001 | | 7/1981 |
| WO | 95/02552 | A1 | 1/1995 |
| WO | 9502552 | A1 | 1/1995 |
| WO | 02/094517 | A1 | 11/2002 |
| WO | 02094517 | A1 | 11/2002 |

OTHER PUBLICATIONS

Installation & User Manual, Sideshift Limit Kit 6836800, Cascade Corporation, 2013, 12 pgs.

International Search Report and Written Opinion, dated May 29, 2015, PCT International Patent App. No. PCT/US15/16662, Cascade Corporation, 7 pgs.

* cited by examiner

SIDE-SHIFT LIMITER

CROSS-REFERENCE TO RELATED APPLICATIONS

Not applicable.

BACKGROUND OF THE INVENTION

The present invention relates to a load engaging apparatus for use with material handling equipment and, more particularly, to controls for transversely movable load engaging members such as forks or clamp arms of a load engaging apparatus associated with material handling equipment.

Material handling equipment used for moving palletized or non-palletized loads from place to place, such as, for example, in a warehouse, typically includes forklift trucks or other types of material handling equipment equipped with load engaging members such as forks or clamp arms. For example, on a typical forklift truck load engaging forks are attached to a carriage which is in turn movably secured in a mast so as to enable the carriage and forks to travel vertically in the mast. Various types of attachments may also be mounted on the carriage or integrated with the carriage. For example, a sideshifter which moves the forks transversely in unison and/or a fork positioner which enables movement of the forks transversely toward and away from each other may be either attached to the carriage or integrated with the carriage structure. Likewise, a load clamp having load-engaging clamp arms similarly movable transversely in unison either toward or away from each other may be attached to the carriage or integral to the carriage. Some attachments also include amotor enabling rotation of the load engaging members and thereby the load about an axis substantially parallel to the longitudinal axis of the material handling equipment.

Load clamps rely on clamping forces applied to the sides of the load for securing the load for lifting and clamp arms may be engineered differently for handling rectangular or cylindrical loads. For example, paper roll clamps and drum-clamping forks may incorporate contours particularly useful for clamping cylindrical loads. On the other hand, "carton clamps" generally refers to clamps with clamp arms adapted to handle rectangular loads such as stacked cartons or household appliances. Carton clamp attachments typically include a pair of large blade-shaped clamp members each of which can be inserted between side-by-side stacks of cartons or appliances to bracket a load comprising one or more appliances or cartons. The clamp members on either side of the load are then drawn together, typically, using hydraulic cylinders to move the clamp members and to apply sufficient compressive force to the load to allow it to be lifted. To securely hold the load, the surfaces of the clamp members which contact the sides of the load are typically constructed of materials such as rubber faced aluminum providing a high coefficient of friction. Carton clamps are most frequently used in the warehousing, beverage, appliance, and electronics industries and may be specifically designed for particular types of loads. For example, carton clamps may be equipped with contact pads that are sized for palletless handling of refrigerators, washers, and other large household appliances (also referred to as "white goods"). In various configurations, carton clamps may be used for handling multiple appliances at one time.

In addition to clamping a load in order to lift and move the load, clamps may be equipped with side-shifting capabilities whereby the clamped load may be repositioned from side-to-side with the clamping members moving transversely in one direction or the other in unison. Similarly, a fork positioner enabling transverse movement of load supporting forks to increase or decrease the distance between the forks may also include side-shifting enabling transverse movement of the forks in unison. When the longitudinal axis of the material handling vehicle is not perfectly aligned, transversely, with the center of a load, a stack or a rack space, side shifting can enable lateral alignment of the load engaging members, clamp arms or forks, with the load, stack or rack opening in which the load is to be engaged or deposited without further maneuvering of the vehicle. In addition, efficient utilization of space, notably when loading a transport vehicle, such as a trailer or railcar, commonly requires that loads be placed in close proximity to a wall or another obstacle. Side shifting allows loads that are narrower than the material handling vehicle to be placed close to a wall without first depositing the load and then pushing it, potentially, damaging it or the material handling vehicle. The side-shifting function may be actuated by one or more hydraulic cylinders separate from the clamping/fork positioning cylinder(s) ("external" side-shifting), or by the clamping/fork positioning cylinders themselves ("internal" side-shifting).

While side shifting is operationally advantageous, the off-center position of the load relative to the material handling vehicle adversely impacts the stability of the vehicle, particularly when the load is elevated. To compensate for the off-center weight of the load, a material handing vehicle may be "de-rated" and relegated to handling loads that are lighter than the nominal capacity load for the same vehicle when it is not equipped for side shifting. Conversely, a higher capacity, more expensive and less maneuverable material handing vehicle may be required to handle a load of a particular size or weight if the load can be side shifted.

What is desired, therefore, is a system and apparatus which optimizes the capability of a material handling vehicle equipped for side shifting.

DETAILED DESCRIPTION OF PREFERRED EMBODIMENTS

In the following detailed description, numerous specific details are set forth in order to provide a thorough understanding of the preferred embodiments. However, those skilled in the art will understand that the present invention may be practiced without these specific details, that the present invention is not limited to the depicted embodiments, and that the present invention may be practiced in a variety of alternate embodiments. In other instances, well known methods, procedures, components, and systems have not been described in detail.

Figure 1:
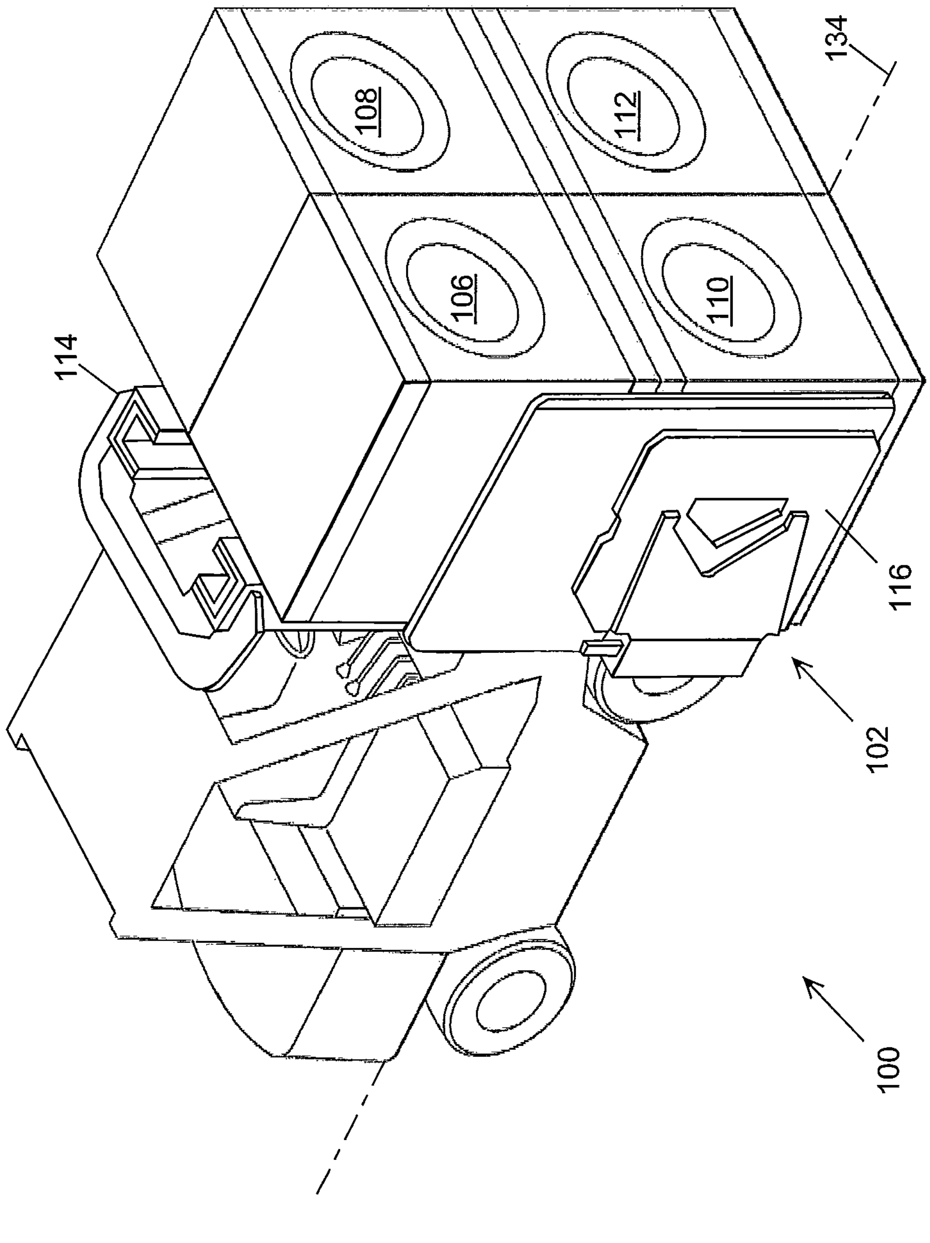
FIG. 1 is a perspective view of an exemplary forklift truck equipped with a load clamp.
Figure 2:
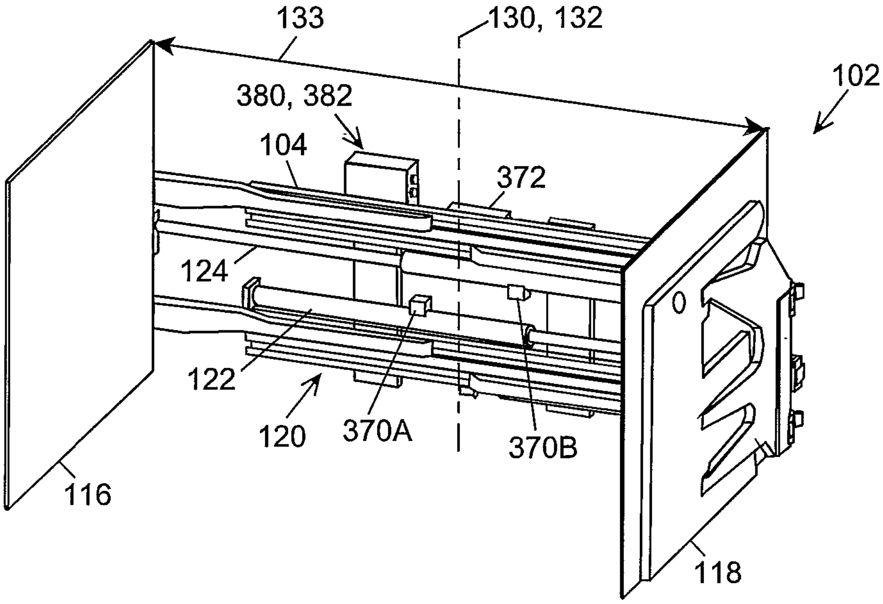
FIG. 2 is a perspective view of a carton clamp attachment for a forklift truck arranged for limited internal side shifting.

Although the preferred embodiments may be implemented in a wide variety of configurations involving different types of material handling equipment and different types of attachments, the following detailed description, where comparable elements are referred to with like reference numbers, discloses the preferred embodiments principally in the context of an exemplary forklift truck 100, as illustrated in FIG. 1, fitted with a carton clamp attachment 102. As shown in FIGS. 1 and 2, the carton clamp attachment 102 is configured for handling white goods such as the four washers 106, 108, 110, 112 clamped between a first clamping member 116 (sometimes referred to as a clamp arm having a contact or clamp pad, which is shown engaging two of the washers 106, 110) and a second, oppositely oriented clamping member 118 which is hidden by the washers in the perspective view of FIG. 1. The carton clamp attachment 102 may comprise a frame 104 that is attachable to a carriage movably secured in a mast assembly 114 mounted to the front of the forklift truck 100 or the attachment's frame may be movably securable in the forklift truck's mast and function as the carriage. Such carriage and mast assembly structures are well known and need not be described in further detail.

Figure 3:
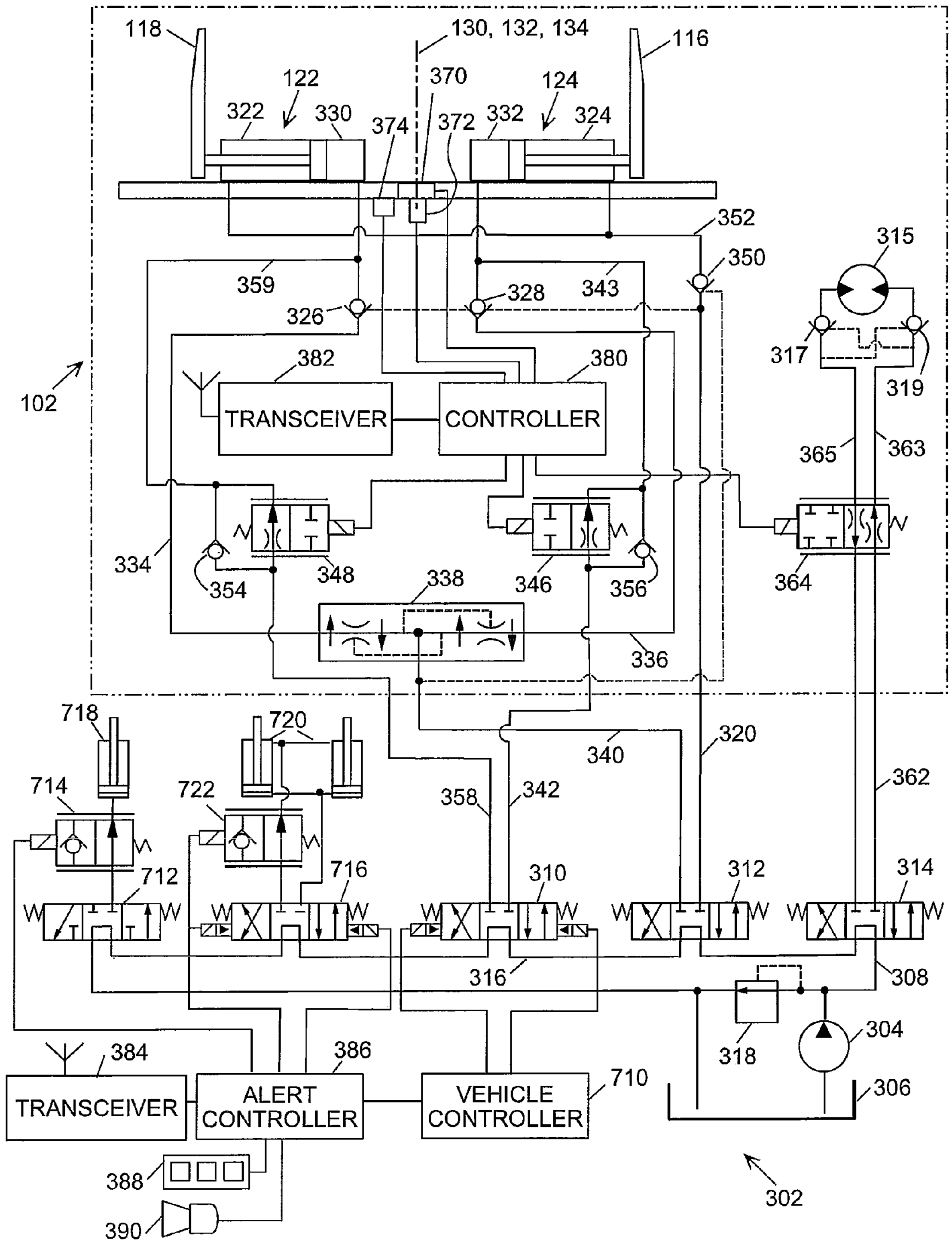
FIG. 3 is a schematic of a side shifting clamp attachment and a side shift limiting system for a material handling vehicle.

Referring also to FIG. 3, the exemplary carton clamp attachment 102 includes a pair of large blade-shaped clamp members 116, 118, shown schematically in FIG. 3 and shown structurally in FIG. 2, which can be positioned on opposing sides of a stack of appliances such as the washers 106, 108, 110, 112 as shown in FIG. 1. Preferably, the forklift is moved forward until the load engages the attachment's load face 120, a portion of the attachment's structure, such as a portion of the frame 104 or the vertical face of load supporting forks, which is engageable with the load and which limits the load's displacement in the direction of the forklift. The clamp members on either side of the load (i.e. the washers 106, 108, 110, 112) are drawn together or moved apart by hydraulic cylinder assemblies 122, 124 controlled by clamp-closing/opening hydraulic circuitry shown schematically in FIG. 3. The hydraulic cylinder assemblies apply a compressive force to the load with sufficient pressure to enable the clamp members to frictionally secure the load for lifting.

Figure 4:
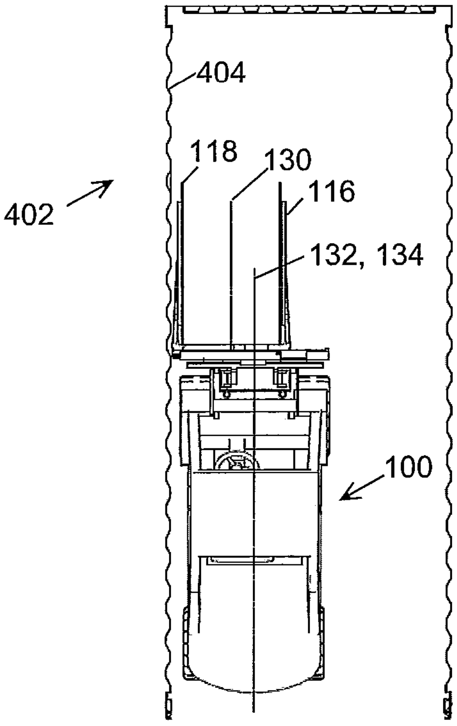
FIG. 4 is a plan view of a forklift truck operating in a walled area.

Referring also to FIG. 4, the carton clamp attachment 102 is preferably equipped with side-shifting capabilities whereby a datum 130, for example, the center of the opening 133 between the load engaging members, for example, the clamp arms 116, 118, defining the lateral position of the load face 120 may be repositioned laterally with respect to the frame 104 of the attachment 102 and, since the frame of the attachment is fixed laterally with respect to the forklift truck, a lateral reference datum for the forklift truck such as the forklift truck's longitudinal center line 134. The exemplary clamp 102 includes internal side-shifting capabilities where the same hydraulic cylinders 122, 124 are arranged to move in opposite directions for clamping and unclamping and to move in unison in the same direction for side shifting. However, shift-shifting may also be of an external type using separate hydraulic cylinders for, respectively, clamping and side-shifting movements.

A forklift truck commonly must be turned at a right angle to the aisle in which it is traveling to engage or deposit a load complicating alignment of the load engaging members with a load to be engaged or a location for depositing a load. If the longitudinal centerline 134 of the forklift is not aligned with the center of the load to be engaged or the place where the load is to be deposited, for example, on a stack, considerable maneuvering may be necessary to move the forklift laterally so that the load engaging members or the load is in the proper position. Side shifting promotes efficiency in forklift operation and reduces operator stress by enabling limited lateral repositioning of the load engaging members relative to the location where the load is to be engaged or deposited without maneuvering the forklift. This promotes more stable stacking and reduces the potential for damage. As illustrated in FIG. 4, side-shifting is also advantageous when depositing a load which is narrower than the forklift proximate a wall or other obstacle, such as for example, when loading an intermodal container or a transport vehicle 402, such as a highway trailer or a railcar. The ability to deposit a load close to a wall 404 is important for the full and efficient utilization of the available volume of the walled area and sideshifting avoids the need to deposit the load and then push it toward the wall which can result in damage to the load and/or the forklift truck.

Figure 5:
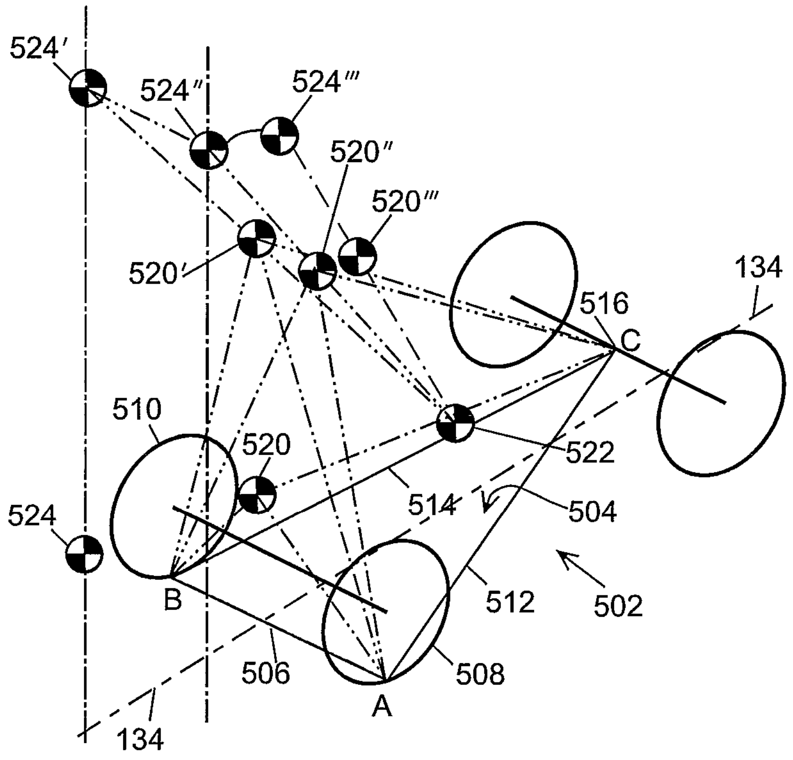
FIG. 5 is a schematic representation of a forklift truck.

While side shifting is advantageous, the lateral displacement of the load relative to the forklift adversely impacts the stability of the forklift particularly when the load is elevated. Referring to FIG. 5, for visualizing the effect of side shifting on the stability of a forklift truck, a counterbalanced forklift may be represented as a pyramid 502 with a triangular base 504 defined by a first axis 506, A-B, extending between the respective areas of contact of the forklift's front or load wheels 508, 510 and second 512 and third 514 axes, A-C and B-C, extending from the center pivot of the rear axle 516 to respective areas of contact of the load wheels. Gravity acts vertically at the combined center of mass 520, which is concentrated at the apex of the pyramid and represents the center of mass of the unladen forklift 522 combined with the center of mass of the load 524, if any. On the other hand, dynamic forces produced by changes in speed and/or direction of the forklift and the load act horizontally at the combined center of mass to urge movement of the center of mass in the direction of at least one of the axes defining the base of the pyramid, A-B, A-C, B-C. For example, braking while moving forward urges the combined center of mass toward axis A-B and centrifugal force produced by turning urges the combined center of mass laterally toward one of the bounding axes A-C or B-C. The pyramid (the forklift) will tip if the combined center of mass of the forklift moves outside of the triangular base 504.

If a capacity load is carried low and centered, the combined center of mass 520 will be located closer to the axis A-B than the center of mass of the unladen forklift 522 and substantially distal of axes A-C and B-C. While resistance to tipping forward when braking is lower, the forklift has substantial reserve resistance to tipping to the side because the low position of the combined center of mass 520 means the horizontal forces are applied to a relatively short moment arm and must displace the combined center of mass a substantial distance before reaching either axis A-C or B-C. But when the load (center of mass 524) is raised toward point 524', the combined center of mass 520' rises with the load to a location more distant from the three axes defining the base of the pyramid, increasing the length of the lever arm on which the horizontal forces act and lowering the resistance of the forklift to tipping in all directions. And when the center of mass of the load is moved laterally away from the longitudinal centerline 134 of the forklift toward point 524", for example, by side shifting, the combined center of mass moves in the direction that the load was shifted toward point 520" and closer to one of the axes, A-C or B-C, reducing the resistance of the forklift to tipping to the side. Furthermore, tilting the mast back shifts the load toward point 524'" and the combined center of mass rearward toward point 520*m* and the apex of the triangular base and even closer to the axes A-C and B-C. Tilting is commonly limited if a forklift is equipped with a mast capable of lifting to substantial heights and may also be restricted if the forklift is equipped for side shifting.

Forklift trucks equipped for side shifting are commonly "derated," that is, the maximum weight of the load that is to be handled with the side shift-capable forklift truck is less than the rated load of the same forklift when not equipped for side-shifting. Conversely, a larger, less maneuverable and more expensive forklift may be required to handle a particular load when the forklift is equipped for side-shifting. However, the inventors herein have realized that the greatest lateral movement of the load is often desired when the load is at a relatively low lift height, for example, to place a load proximate a wall of a transport vehicle, and when the load is lifted higher, more limited lateral shifting of the load will often suffice to permit centering the load engaging members with respect to a load or aligning a load with a stack or a rack opening. In addition, restricting side shifting speed as the lift height, back tilt and/or lateral displacement of the load increases reduces the dynamic forces resulting from acceleration and deceleration of the load. The inventors have concluded that the capacity of a forklift truck can be optimized by limiting the lateral displacement and speed of the load when it is lifted to greater heights and/or tilted rearward while allowing maximum side-shifting displacement and speed at lower lift heights.

Referring to FIG. 3, the exemplary forklift 100 is equipped with a system 302 that limits the lateral speed and displacement of the side shifting attachment 102 according to the lift height and, preferably, the back tilt of the mast and announces one or more alerts to the forklift's operator when lateral displacement of the attachment is approaching or has reached one or more limits. The pair of hydraulic cylinder assemblies 122, 124 are arranged to move the load engaging members, clamp arms 116, 118, in directions transverse to the longitudinal axis 134 of the forklift. The exemplary attachment 102 is arranged for internal side shifting with the hydraulic cylinder assemblies 122, 124 connectable to a source of pressurized fluid, pump 304, in ways that cause the cylinders to either extend or retract in opposing directions to clamp or unclamp a load between the clamp arms 116, 118 or to extend or retract in the same direction to move a load face datum defining the lateral position of the attachment's load face, for example, the lateral centerline of the load face 130 defined by the clamp arms, relative to the lateral center 132 of the attachment's frame 104 and thereby relative to a datum establishing the lateral position of the forklift 100, for example, the longitudinal centerline 134 of the forklift.

Typically, the pump 304 is driven by a motor or engine (not shown) of the material handling equipment, for example, the exemplary forklift truck 100, and draws fluid from a reservoir 306 and discharges the fluid to a supply conduit 308. When the plural control valves 310, 312, 314, 712 and 716 are centered (as pictured) and blocking the passage of fluid toward the system's actuators, i.e. the hydraulic cylinder assemblies 122, 124 and the motor 315, passages in each of the control valves and an open center conduit 316 connect the supply conduit 308 to the reservoir 306. If the pressure in the supply conduit 308 exceeds a system relief pressure, a system relief valve 318 will permit fluid to flow from the supply conduit to the reservoir The exemplary system 302 includes a clamp/unclamp control valve 312 or, if the forklift truck is equipped with a fork positioner attachment, a fork position control valve, which includes a valve spool that is shiftable to the left from the illustrated center position blocking flow to a second position enabling pressurized fluid to flow from the supply conduit 308 and open center conduit 316 through conduits 320 and 352 to the rod ends 322, 324 of the hydraulic cylinder assemblies 122, 124. Pressure in the rod ends 322, 324 urges the cylinders to retract moving the clamp arms 116, 118 toward each other to clamp a load. Pressure in conduit 320 unseats a pair of pilot operated check valves 326, 328 allowing fluid to flow out of the piston ends 330, 332 of the hydraulic cylinders through conduits 334, 336. The fluid expelled from the piston ends of the hydraulic cylinders 122, 124 flows through a flow divider/combiner valve 338 which maintains a substantially equal flow from the piston ends of the respective cylinders so that the cylinders retract at substantially the same rate. The fluid from the piston ends 330, 332 of the hydraulic cylinders 122, 124 flows from the flow divider/combiner valve 338 to the reservoir 306 through a conduit 340, a passage in the clamp/unclamp control valve 312 and the open center conduit 316. Conversely, shifting the clamp/unclamp control valve 312 to the right from the center position directs pressurized fluid through conduit 340 to the flow divider combiner valve 338 and then through conduits 334, 336 and check valves 326, 328 to the piston ends 330, 332 of the hydraulic cylinders 122, 124. Pressure in the piston ends of the hydraulic cylinders 122, 124 urges extension of the hydraulic cylinders and opening of the clamp arms 116, 118 and forces fluid from the rod ends 322, 324 of the hydraulic cylinders back to the reservoir 306 via conduits 320, 352 and the pilot operated check valve 350 which, due to pressure in conduit 340, is open.

The side shift control valve 310 is also a three position valve with a center position (as illustrated) blocking flow toward the hydraulic cylinders 122, 124. When the valve is moved to the left from the illustrated centered position, fluid is directed from the open center conduit 316 to conduit 342 and a right secondary side shift control valve 346 which is normally open permitting flow into conduit 343 to the piston end 332 of the right hand hydraulic cylinder 124. The pressure in the piston end of the right-hand hydraulic cylinder 124 urges the cylinder to extend and move the right hand clamp arm 116 to the right. Fluid is forced out of the rod end 324 of the right hand cylinder 124 but the check valve 350 blocks flow to the reservoir 306 forcing the fluid to flow to the rod end 322 of the left hand hydraulic cylinder assembly 122 through conduit 352. Fluid is expelled from the piston end of the left hand hydraulic cylinder assembly 122 through conduit 359 and, at least one of the check valve 354 and the normally open, left secondary side shift control valve 348. Fluid returns to the reservoir 306 through the side shift control valve 310 and the left hand clamp arm 118 moves to the right in unison with the right hand clamp arm 116.

Conversely, moving the sideshift control valve 310 to the right from the center position directs fluid from the pump 304 into conduit 358. The fluid flows through the normally open, left secondary side shift valve 348 and into the piston end 330 of the left hand hydraulic cylinder assembly 122 through conduit 359. The left hand hydraulic cylinder is urged to extend and move the left hand clamp arm 118 left forcing fluid from the rod end 322 of the left hand hydraulic cylinder 122 through conduit 352 to the rod end 324 of the right hand hydraulic cylinder 124. Fluid is expelled from the piston end of the right hand hydraulic cylinder assembly 124 through conduit 343 and, at least one of the check valve 356 and the normally open, left secondary side shift control valve 346. Fluid returns to the reservoir 306 through the side shift control valve 310 and the right hand clamp arm 116 moves to the left in unison with the left hand clamp arm 118.

In addition, the exemplary attachment 102 includes a hydraulic motor 315 arranged to rotate the attachment's load face about an axis substantially parallel to the longitudinal centerline 134 of the forklift. The hydraulic motor 315 is controlled by a rotation control valve 314 similar to the side shift control valve 310 and the clamp/unclamp valve 312. Shifting the rotation control valve 314 in a first direction directs oil into conduit 362 and through a normally open, secondary rotation control valve 364. Pressure in conduit 363 unseats the pilot operated check valve 317 permitting fluid to flow through the check valve 319, the motor 315 and back to the reservoir through conduit 365 causing the motor to rotate the attachment's load face in a first direction. Shifting the rotation control valve 314 in the opposite direction from the center position causes the motor 315 to rotate the attachment's load face in the direction opposite of the first direction.

The exemplary attachment 102 further comprises a side shift sensor (indicated generally as) 370 which may comprise multiple sensors as described hereafter, a lift height sensor 372 and, preferably, a back tilt sensor 374. The lift height sensor 372 is preferably affixed to the frame 104 of the attachment 102 and enables determination of a distance between a height datum for the attachment, for example, the location of the lift height sensor, and the surface supporting the material handling vehicle. Although the lift height may be measured directly, it may also be computed by sensing a distance to a reference datum on the material handling vehicle, for example the base of the mast 114, which has a known or determinable distance from the ground. By way of examples only, the lift height sensor may comprise a laser range finder, a cable actuated encoder, an optical sensor arranged to detect targets affixed to the material handling vehicle or an accelerometer arranged to determine displacement from a datum by dead reckoning.

The side shift sensor 370, which may comprise plural sensors 370A and 370B, is preferably affixed to a portion of the attachment that does not move laterally with respect to the material handling vehicle, such as the frame 104 or the shells of the hydraulic cylinder assemblies 122, 124, and enables determination of a distance between a lateral load face datum, such as the lateral center 130 of the load face 133 as defined by the load engaging members, and a lateral datum of the material handling vehicle, such as the vehicle's longitudinal center line 134. External side shifting attachments comprise an actuator, typically a hydraulic cylinder assembly, which is dedicated to the side shift function, enabling the lateral displacement to be determined with a single side shift sensor arranged to detect the displacement of the actuator or another part of the attachment displaced by the actuator. On the other hand, internal side shifting attachments, such as the exemplary attachment 102, typically utilize plural actuators to provide for coordinated movement of the clamp arms or other load engaging members and the location of the load face lateral datum is, preferably, determined from respective measurements to each load engaging member 116, 188 or a structural element movable with the load engaging members by one or more side shift sensors, such as plural side shift sensors 370A, 370B. The plural side shift sensors are preferably attached to points fixed relative to the material handling vehicle, for examples the shells of the clamping/side shift hydraulic cylinder(s) as shown in FIG. 2 or the attachment frame 104. By way of example only, the sideshift sensor(s) 370 might comprise laser range finders, cable actuated encoders, linear transducers, an accelerometer, optical sensors arranged to detect and count or decode targets on movable portions of the attachment or the actuators as disclosed in U.S. Patent Publication No: US 2013/0277584 or one or more limit switches operable by lateral displacement of a portion of the attachment.

The exemplary attachment 102 also preferably, but not necessarily, includes a sensor 374 to detect the rearward tilt of the material handling vehicle's mast 114. The angle of the mast and load face of a forklift is typically changed by a pair of hydraulic tilt cylinder assemblies 720 connecting the forklift's frame and mast 114. Mast tilt may be sensed, for example, by a linear transducer attached to the mast or one of the hydraulic tilt cylinder assemblies or, preferably, by an inclinometer or triaxial accelerometer affixed to the attachment.

Figure 6A:
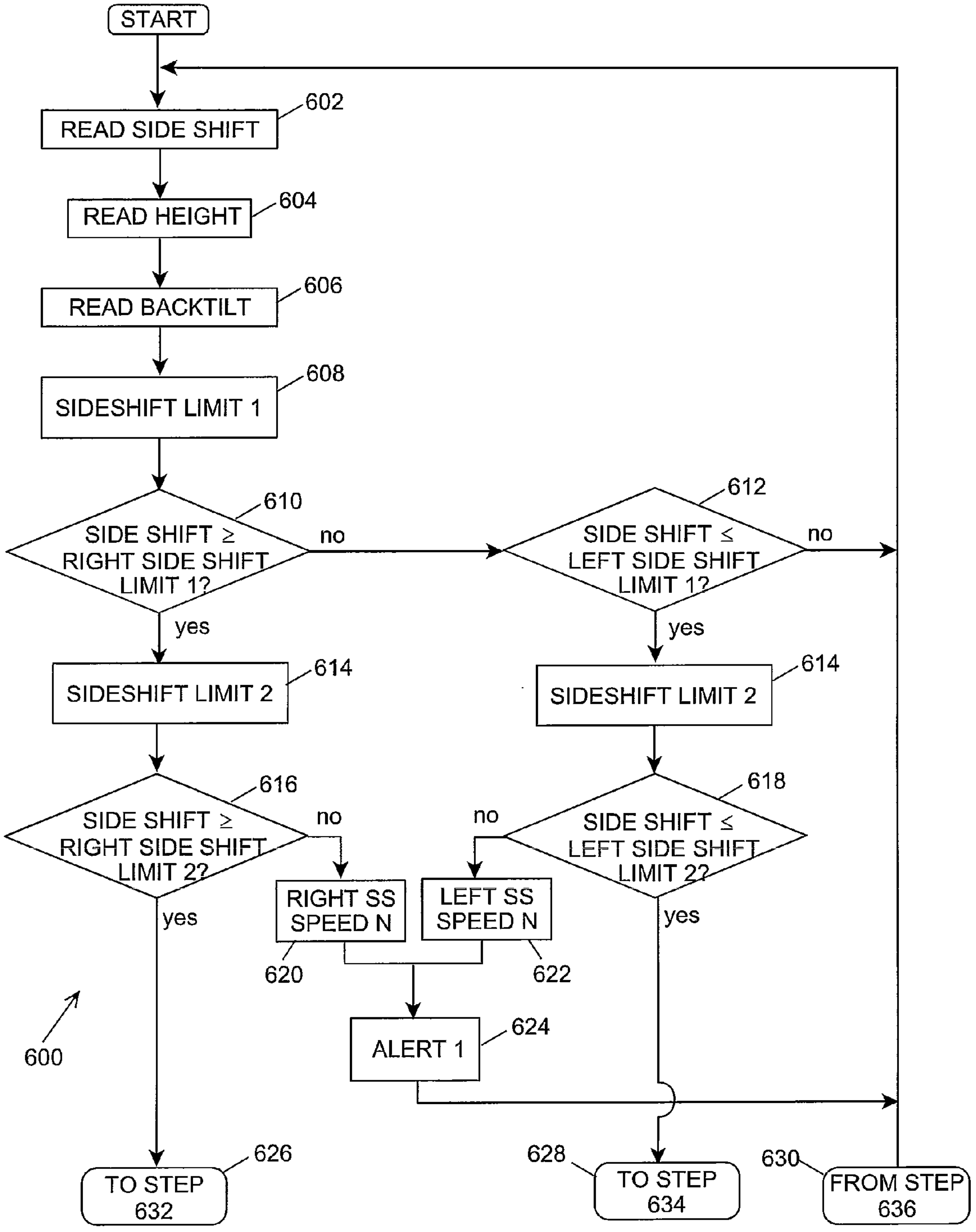
FIG. 6A is a first portion of a flow diagram for a method of side shift limiting.
Figure 6B:
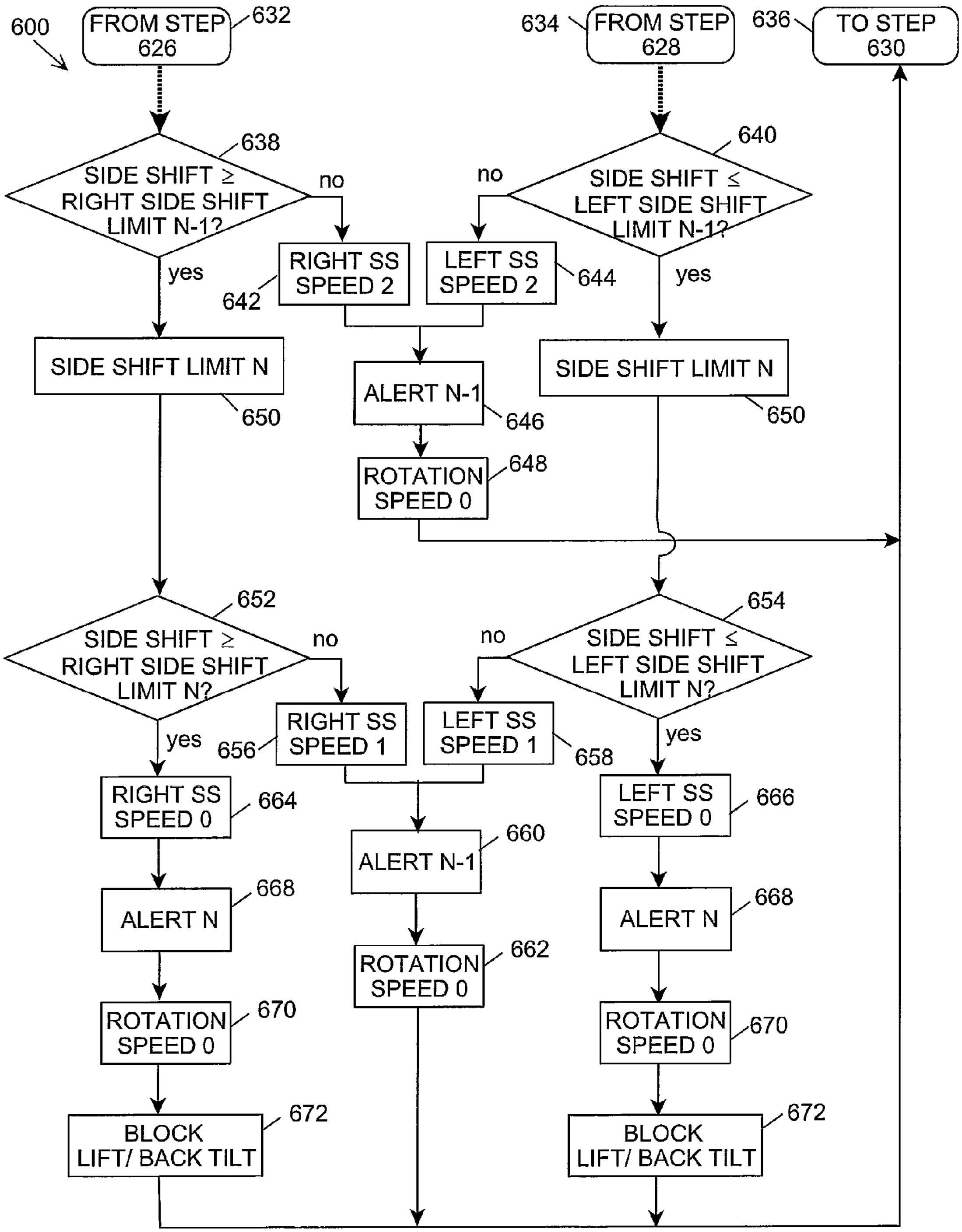
FIG. 6B is a second portion of the flow diagram of FIG. 6A.
Figure 7:
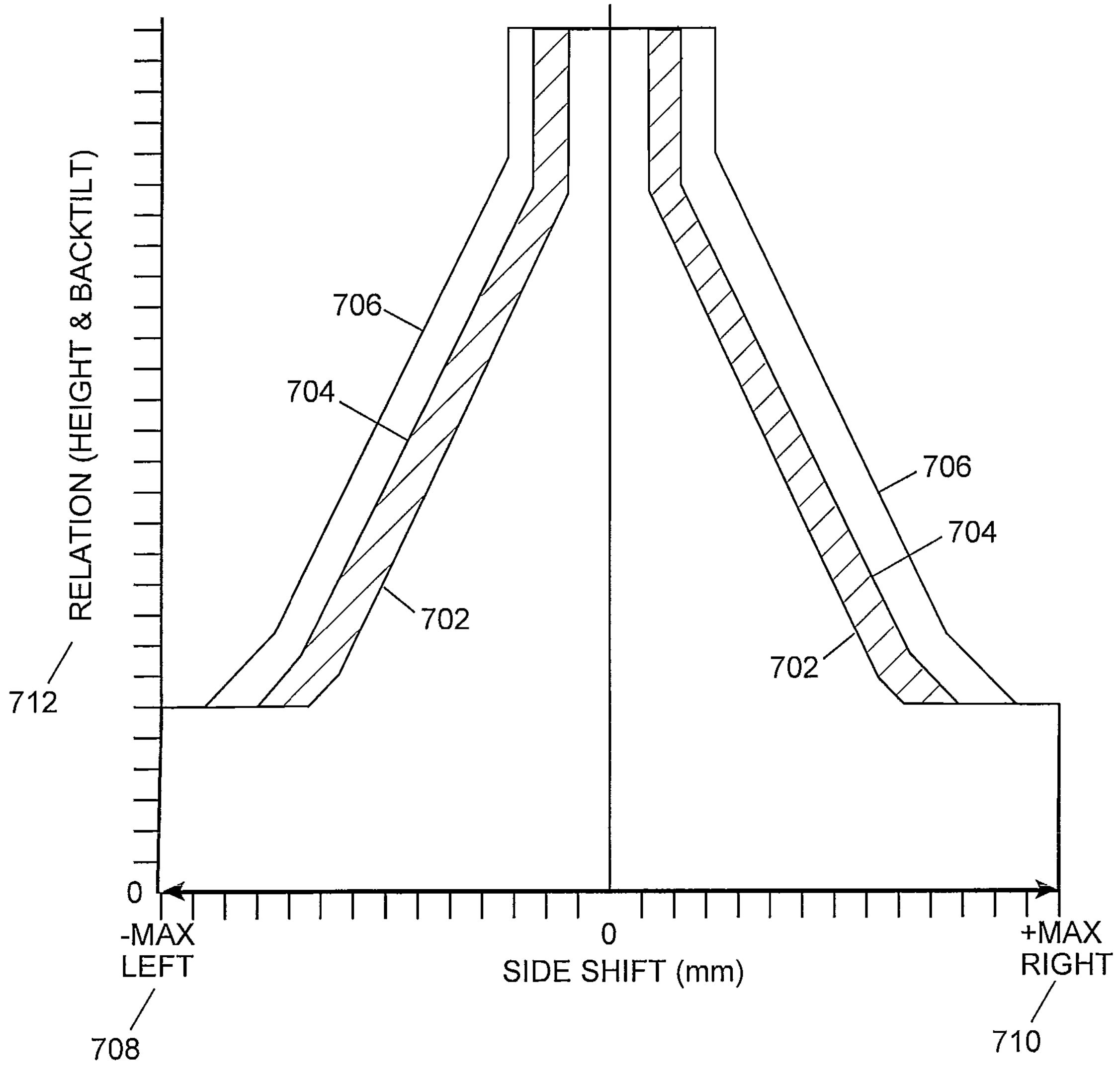
FIG. 7 is a graphic representation of side shift limits vs lift height and back tilt for a forklift truck.

Referring also to FIGS. 6A and 6B, an exemplary side shift limiting method 600 is executed by a controller 380, shown in FIG. 3, and, preferably, affixed to the attachment 102. The controller operates according to instructions stored in a memory to periodically read the outputs of the side shift sensor(s) 602, the lift height sensor 604 and, optionally, the back tilt sensor 606 and to output signals to activate transducers providing one or more alerts to the operator of the material handling vehicle and/or limit the speed and/or displacement of the attachment if the sensed lateral displacement of a load face lateral datum exceeds one or more side shift limits corresponding to the sensed lift height or, preferably, the sensed lift height and back tilt. Referring also to FIG. 7, one or more side shift limits, for example side shift limits 702, 704, 706, may be stored in a memory of the controller 380 for each of plural lift heights, preferably at one or more back tilt angles, or for each of plural values of a relationship combining back tilt and lift height. On the other hand, the controller may calculate one or more side shift limits for the sensed lift height or, alternatively, the sensed lift height and back tilt. As illustrated in FIG. 7, the maximum side shift displacement 708, 710, on either side of the fork lift center line datum 134 is preferably permitted only at lower lift heights or when a relationship of lift height and back tilt 712 is relatively low. By way of example only, "lower lift heights" might be lift heights lower than the mast's freelift height, i.e. the lift height at which the overall height of the mast begins increasing, or a lift height enabling a second load to be deposited on a load having the height of a rated load for the material handing vehicle. At higher lift heights, preferably combined with back tilt, side shifting displacement and speed may be restricted to limit or reduce the effects of lateral acceleration of an off-center load on the stability of the material handling vehicle. For example, unrestricted side shift speed may be permitted within a first side shift limit 702 and side shift displacement and attachment rotation, if applicable, and, optionally, hoisting and/or back tilting may be blocked at a maximum side shift limit 706 appropriate for sensed a lift height and, preferably, a lift height and back tilt. At one or more other side shift limits between a first side shift limit 702 and a second side shift limit 706, for example side shift limit 704, other action may be taken such as issuing various alerts to the operator and/or reducing the side shift speed to reduce dynamic forces produced by acceleration/deceleration of the load and/or, if the attachment includes a rotator, blocking or limiting rotator speed. For example, the side shifting speed may be restricted to vary proportionally or non-proportionally with displacement over some portion of the side shift displacement. Maximum side shift displacement may be permitted to a specified lift height, and/or lift height and back tilt angle, and side shift displacement may be restricted to a single value at greater lift heights or, as illustrated, there may be a range of lift heights or lift height and back tilt angles where the permitted side shift displacement is changing according to a relationship with the lift height or, preferably, a relationship combining the lift height and the back tilt. Typically, the side shift limits are symmetrical about the longitudinal center line of the forklift but for certain loads the limits might differ on respective sides of the centerline.

With reference to FIG. 6A, the controller 380 looks up, calculates or otherwise determines a first side shift limit 608, a first limiting value of the lateral displacement of a load face datum, for example the center of the load face 130, relative to a lateral datum for the material handling vehicle, for example the longitudinal centerline 134. For example the first side shift limit may be the value of the side shift limit 702, corresponding to the sensed lift height 604 and preferably the sensed lift height 604 and back tilt 606 measured by the respective sensors. At step 610, the controller compares the first right side shift limit to the sensed side shift displacement. If the sensed side shift displacement 602 is not equal to or greater than the value of a first right hand side shift limit, the controller determines if the side shift displacement is less than a first left side shift limit 612. In the example illustrated in FIG. 7 the magnitude of the right and left side shift limits are the same for any lift height and back tilt but a position to the right of the lateral center 132 of the attachment's frame, and thereby to the right of the centerline 134 of the forklift truck 100 (right side shift), may have a positive value while a position to the left of the lateral center of the attachment (left side shift) may have a negative value. The lateral displacement of the load face datum 130 can be determined by, for example, subtracting from the lateral position of the right clamp arm 116 or adding to the lateral position of the left clamp arm 118 one half of the sum of the absolute values of the lateral positions of the respective clamp arms, that is, one half of the distance between the clamp arms 133. If the side shift displacement does not exceed either the first right or first left side shift limit, the controller reads side shift displacement 602, the lift height 604 and, preferably, the back tilt 606 again.

If the sensed side shift displacement equals or exceeds one of the first right or the first left side shift limit 610, 612, the controller determines a second side shift limit 614 for the respective side shift direction. The second side shift limit, for example, side shift limit 704, typically includes greater lateral displacement than the first side shift limit. The controller 380 compares the sensed side shift displacement to the appropriate second right 616 or left side shift limit 618. If the sensed side shift exceeds a first side shift limit but does not equal or exceed the second right side shift limit 616 or the second left side shift limit 618, as appropriate, the controller may signal 620, 622 the appropriate one of the right secondary side shift valve 346 or the left secondary side shift valve 348 to restrict the fluid flowing in the appropriate direction to the side shift hydraulic cylinder(s) thereby the limiting the side shifting speed in the direction that would tend to reduce the material handling vehicle's resistance to tipping. Preferably, the right 346 and left 348 secondary side shift valves and the secondary rotation valve 364 are proportional flow valves arranged to meter the respective flows in response to differing or varying signals, such as pulse width modulated signals, from the controller. Also preferably, the controller 380 includes instructions to vary the signal to the secondary side shift valves and the secondary rotation valve to variably restrict the respective flows to control acceleration as well as the speed of the hydraulic actuators limiting forces produced by movement of the load.

If the side shift displacement exceeds the first side shift limit but does not exceed a second side shift limit, the controller 380 may signal an alert controller 386 to issue an operator alert 624. The exemplary system 302 includes a first transducer 388 arranged to visually alert the operator of the material handling vehicle that the side shift displacement has reached or is proximate a limit, and a second transducer 390 to audibly alert the operator in response to signals output by an alert controller 386. Preferably, the controller 380 is located on the attachment and is communicatively connected to the alert controller 386 by a first radio frequency transceiver 382 and a second radio transceiver 384 associated with the alert controller which is preferably located on the material handling vehicle. The first transducer 388 may comprise, for example, an array of lights of different colors, a light which flashes at plural frequencies or a display for a text message to indicate that side shifting has reached or is proximate a side shift limit. The audible operator alerting transducer 390 might, by way of example, comprise a tonal device which annunciates a tone of varying frequency, amplitude or intermittence as the side shift increases or the audible alert transducer may comprise a speech synthesizer that emits recorded or synthesized messages, for example advising the operator when the appropriate side shift limit is reached or is approaching, that further side shifting will be slowed or blocked and/or that the attachment should be centered, if possible. If the side shift displacement exceeds either of the first side shift limits but not the second side shift limit, the controller 380 reads the lift height 604, back tilt 606 and side shift 602 sensors again.

Referring also to FIG. 6B, if, however, the side shift displacement exceeds the first and the second side shift limit, the controller determines a next side shift limit and repeats the process until the sensed side shift displacement no longer exceeds a side shift limit. For example, in a system with n side shift limits, if the sensed side shift exceeds the first n−2 side shift limits but does not exceed the right n−1 side shift limit 638 or the left n−1 side shift limit 640, for example, the controller 380 may signal the appropriate secondary side shift valve to further reduce the side shift speed 642, 644 and direct the alert controller 386 to issue a different operator alert 646. If the attachment includes a rotator, the controller may signal the secondary rotation control valve 364 to restrict or prevent rotation 648 to prevent or lessen dynamic forces accompanying a change in speed or position of the load's center of mass.

If the side shift displacement exceeds either the right or the left n−1 (next to last) side shift limit, the controller 380 determines the maximum side shift limit (limit n), for example limit 706, corresponding to the sensed lift height and, preferably, back tilt, 650. The controller compares the sensed side shift displacement to the appropriate right 652 or left 654 maximum side shift limit. If the sensed side shift displacement does not equal or exceed one of the maximum side shift limits, the controller 380 may further restrict the appropriate right 656 or left 658 side shift speed, issue a new operator alert or continue the issuance of an earlier operator alert 660 and block or continue to block rotation 662.

If, however, the side shift displacement equals or exceeds one of the right 652 or left 654 maximum (n) side shift limits at the sensed lift height and, preferably back tilt, the controller preferably signals the appropriate secondary side shift valve 346, 348 to block further side shift displacement in the direction of the maximum limit 664, 666. In addition, the controller 380 may signal the alert controller 386 to issue another operator alert 668, block rotation 670 and block lifting and/or back tilting 672. The check valves 354, 356 permit fluid to flow from the respective piston ends 330, 332 of the hydraulic cylinders 122, 124 enabling centering of the attachment even if the right secondary side valve 346 or the left secondary side shift valve 348 is shifted to block a flow of fluid which would increase the side shifting. In any event, the controller 380 continues sampling the output of the side shift, lift height and back tilt transducers and comparing the sensed side shift displacement to one or more side shift limits for the sensed lift height and preferably the sensed lift height and sensed back tilt.

Alternatively, the controller 380 may transmit signals to the alert controller 386 to control the side shifting and rotation of the attachment and, optionally, the lifting and/or tilting of the material handling vehicle's mast. If the material handling vehicle is equipped with a remotely controllable side shift valve, such as side shift valve 310, the side shift displacement and speed may be controlled by operation of the side shift valve without intervention of secondary side shift valves, such as secondary side shift valves 346, 348. Instructions from the controller 380 and, preferably, relayed by the alert controller 386 to a vehicle controller 710 which controls the operation of a remotely operable side shift valve 310 may cause the vehicle controller to manipulate the remotely operable side shift valve to change the side shift speed and maximum lateral displacement or to cause the attachment to be displaced toward the center of the frame as the lift height and/or back tilt increases to keep the side shift within a limit. On the other hand, the alert controller could be arranged to transmit a signal directly to a remotely operable valve, such as tilt valve 716, to cause the valve to control the operation of associated transducers, such as tilt cylinders 720.

Optionally, functions such as lifting and tilting may be controlled with secondary valves, such as the secondary lifting control valve 714 and the secondary tilting control valve 722. If the operator of the material handling vehicle attempts to lift a side shifted load to a height that would exceed an allowable lift height for the sensed lateral position of the load, a signal from the controller 380 or the alert controller 386 can shift a secondary lifting valve 714 to block the flow of hydraulic fluid from the material handling vehicle's hoist valve 712 preventing further lifting. Likewise, if the operator of the material handling vehicle attempts to tilt the vehicle's mast at a lift height that would exceed an allowable lift height and back tilt for the sensed lateral position of the load, a signal from the controller 380 or the alert controller 386 can shift a secondary tilting control valve 722 to limit or block the flow of hydraulic fluid from the material handling vehicle's tilt control valve 716 limiting the speed or preventing further back tilting.

The side shift limiting attachment alerts the operator if lateral displacement of the load face is approaching a limit for a lift height and, preferably, back tilt and blocks or slows further side shifting and/or rotation of the attachment when a side shift limit is reached for a specific lift height and back tilt.

The detailed description, above, sets forth numerous specific details to provide a thorough understanding of the present invention. However, those skilled in the art will appreciate that the present invention may be practiced without these specific details. In other instances, well known methods, procedures, components, and circuitry have not been described in detail to avoid obscuring the present invention.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

We claim:

1. A system for limiting a lateral position of a load face for a material handling vehicle, the system comprising:

(a) a lateral position sensor arranged to output a lateral position datum quantifying a distance between a material handling vehicle lateral datum and a load face lateral datum;

(b) a height sensor arranged to output a height datum quantifying a height of a vertical load face datum relative to a surface supporting said material handling vehicle; and (c) a controller arranged to receive said lateral position datum and said height datum and to output a side shift control signal when said lateral position datum corresponds to a side shift limit for said height datum.

2. The system for limiting a lateral position of a load face for a material handling vehicle of claim 1 further comprising a tilt sensor arranged to output a tilt datum quantifying an angle of said load face, said controller arranged to receive said tilt datum and output said side shift control signal when said lateral position datum corresponds to a side shift limit for said height datum and said tilt datum.

3. The system for limiting a lateral position of a load face for a material handling vehicle of claim 1 further comprising a side shift indicator responsive to said side shift control signal to announce that said load face lateral datum corresponds to said side shift limit.

4. The system for limiting a lateral position of a load face for a material handling vehicle of claim 3 wherein announcement that said load face lateral datum corresponds to said side shift limit comprises an optical signal.

5. The system for limiting a lateral position of a load face for a material handling vehicle of claim 3 wherein announcement that said load face lateral datum corresponds to said side shift limit comprises an audible signal.

6. The system for limiting a lateral position of a load face for a material handling vehicle of claim 3 further comprising a side shift indicator responsive to a second side shift control signal output by said controller to announce that said load face lateral datum is proximate said side shift limit.

7. The system for limiting a lateral position of a load face for a material handling vehicle of claim 6 wherein announcement that said load face lateral datum corresponds to said side shift limit comprises a first optical signal and said announcement that said load face lateral datum is proximate said side shift limit comprises a second optical signal.

8. The system for limiting a lateral position of a load face for a material handling vehicle of claim 6 wherein announcement that said load face lateral datum corresponds to said side shift limit comprises a first audible signal and said announcement that said load face lateral datum is proximate said side shift limit comprises a second audible signal.

9. The system for limiting a lateral position of a load face for a material handling vehicle of claim 1 further comprising a side shift control responsive to said side shift control signal to restrict a speed of lateral movement of said load face when said lateral position datum corresponds to said side shift limit.

10. The system for limiting a lateral position of a load face for a material handling vehicle of claim 1 wherein said side shift control responsive to said side shift control signal blocks lateral movement of said load face when said lateral position datum corresponds to said side shift limit.

11. The system for limiting a lateral position of a load face for a material handling vehicle of claim 9 further comprising a side shift indicator responsive to said side shift control signal to announce that said load face lateral datum corresponds to said side shift limit.

12. The system for limiting a lateral position of a load face for a material handling vehicle of claim 11 wherein announcement that said load face lateral datum corresponds to said side shift limit comprises an optical signal.

13. The system for limiting a lateral position of a load face for a material handling vehicle of claim 11 wherein announcement that said load face lateral datum corresponds to said side shift limit comprises an audible signal.

14. The system for limiting a lateral position of a load face for a material handling vehicle of claim 11 further comprising a side shift indicator responsive to a second side shift control signal output by said controller to announce that said load face lateral datum is proximate said side shift limit.

15. The system for limiting a lateral position of a load face for a material handling vehicle of claim 14 wherein announcement that said load face lateral datum corresponds to said side shift limit comprises a first optical signal and said announcement that said load face lateral datum is proximate said side shift limit comprises a second optical signal.

16. The system for limiting a lateral position of a load face for a material handling vehicle of claim 14 wherein announcement that said load face lateral datum corresponds to said side shift limit comprises a first audible signal and said announcement that said load face lateral datum is proximate said side shift limit comprises a second audible signal.

17. The system for limiting a lateral position of a load face for a material handling vehicle of claim 9 wherein said side shift control permits lateral movement of said load face to decrease a distance between said material handling vehicle lateral datum and said load face lateral datum when said lateral position datum corresponds to said side shift limit.

18. The system for limiting a lateral position of a load face for a material handling vehicle of claim 9 further comprising a rotator control responsive to said side shift control signal to interrupt rotation of said load face when said lateral position datum corresponds to said side shift limit.

19. The system for limiting a lateral position of a load face for a material handling vehicle of claim 1 further comprising a lifting control responsive to said side shift control signal to prevent increasing said height datum when said lateral position datum corresponds to said side shift limit.

20. The system for limiting a lateral position of a load face for a material handling vehicle of claim 2 further comprising a tilting control responsive to said side shift control signal to prevent an increase in said tilt datum when said lateral position datum corresponds to said side shift limit.

21. A load handling attachment for a material handling vehicle, said load handling attachment comprising;

(a) a load face defined by a load engaging member and movable laterally and vertically relative to said material handling vehicle;

(b) a lateral position sensor arranged to output a lateral position datum quantifying a distance to a lateral load face datum;

(c) a height sensor arranged to output a height datum quantifying a distance between a load face height datum and a surface supporting said material handing vehicle; and (d) a controller arranged to receive said lateral position datum and said height datum and operable according to a stored instruction to output a side shift control signal when said lateral position datum exceeds a side shift limit for said height datum.

22. The load handling attachment of claim 21 further comprising a side shift control device to limit a speed of lateral displacement of said lateral load face datum in response to said side shift control signal.

23. The load handling attachment of claim 22 wherein said side shift control device prevents a lateral displacement of said lateral load face datum in response to said side shift control signal.

24. The load handling attachment of claim 23 wherein said side shift control device permits decreasing said lateral displacement of said lateral load face datum when increasing said lateral displacement is blocked.

25. The load handing attachment of claim 21 further comprising a tilt sensor arranged to quantify an angular orientation of said load face, said controller arranged and operable according to a stored instruction to output said side shift control signal when said lateral position datum exceeds a side shift limit for said height datum at a predetermined angular orientation.

26. The load handling attachment of claim 21 further comprising:

(a) an actuator arranged to selectively rotate said load face; and (b) a rotation control arranged to limit a speed of rotation of said load face in response to at least one of said side shift control signal and a rotation control signal from said controller.

27. The load handling attachment of claim 21 further comprising an audible side shift indicator responsive to said side shift control signal to audibly annunciate that said lateral displacement of said load face is proximate a side shift limit.

28. The load handling attachment of claim 21 further comprising a visual side shift indicator responsive to said side shift control signal to visually signal that said lateral displacement of said load face is proximate a side shift limit.

29. The load handling attachment of claim 21 further comprising a lifting control device responsive to said side shift control signal to prevent an increase in said height datum when said lateral position datum exceeds a side shift limit for said height datum.

30. The load handling attachment of claim 25 further comprising a tilting control device responsive to said side shift control signal to prevent a change in said angular orientation of said load face when said lateral position datum exceeds a side shift limit.

31. A method for limiting a lateral position of a load face for a material handling vehicle, the method comprising the steps of:

(a) quantifying a distance between a material handling vehicle lateral datum and a load face lateral datum;

(b) quantifying a height of a vertical load face datum relative to a surface supporting said material handling vehicle; and (c) limiting a speed of lateral displacement of said load face datum when said distance between said material handling vehicle lateral datum and said load face lateral datum corresponds to a limit at said height datum.

32. The method of limiting the lateral position of a load face for a material handling vehicle of claim 31 further comprising the steps of:

(a) quantifying an angle of said load face; and (b) further limiting said speed of lateral displacement when said distance between said material handling vehicle lateral datum and said load face lateral datum corresponds to a limit at said height datum and said angle of said load face.

33. The method of limiting the lateral position of a load face for a material handling vehicle of claim 31 further comprising the step of displaying an optical signal when said distance between said material handling vehicle lateral datum and said load face lateral datum is proximate said limit.

34. The method of limiting the lateral position of a load face for a material handling vehicle of claim 31 further comprising the step of annunciating an audible signal when said when said distance between said material handling vehicle lateral datum and said load face lateral datum is proximate said limit.

35. The method of limiting the lateral position of a load face for a material handling vehicle of claim 31 further comprising the step of preventing an increase in said height of said vertical load face datum when said distance between said material handling vehicle lateral datum and said load face lateral datum corresponds to said limit.

36. The method of limiting the lateral position of a load face for a material handling vehicle of claim 31 further comprising the steps of:

(a) quantifying an angle of said load face; and (b) preventing an increase in said angle of said load face when said distance between said material handling vehicle lateral datum and said load face lateral datum corresponds to said limit.

* * * * *